United States Patent

Wagner et al.

[11] Patent Number: 5,941,609
[45] Date of Patent: Aug. 24, 1999

[54] METHOD AND APPARATUS FOR CONTROLLING BRAKING PRESSURE

[75] Inventors: Wilfried Wagner, Hüttenberg; Vladimir Dusil, Griesheim; Jürgen Bauer, Wiesbaden, all of Germany

[73] Assignee: ITT Automotive Europe GmbH, Germany

[21] Appl. No.: 08/737,958

[22] PCT Filed: May 16, 1995

[86] PCT No.: PCT/EP95/01860

§ 371 Date: Nov. 26, 1996

§ 102(e) Date: Nov. 26, 1996

[87] PCT Pub. No.: WO95/32878

PCT Pub. Date: Dec. 7, 1995

[30] Foreign Application Priority Data

May 26, 1994 [DE] Germany .............................. 44 18 270

[51] Int. Cl.⁶ ..................................................... B60T 8/44
[52] U.S. Cl. .................................... 303/114.3; 303/113.4; 303/115.3
[58] Field of Search .............................. 303/114.3, 174, 303/115.3, 113.4; 91/369.1, 376 R

[56] References Cited

U.S. PATENT DOCUMENTS

| | | |
|---|---|---|
| 4,484,281 | 11/1984 | Skarvada . |
| 5,173,859 | 12/1992 | Deering . |
| 5,224,410 | 7/1993 | Graichen et al. . |
| 5,460,074 | 10/1995 | Balz et al. .............................. 91/369.1 |

FOREIGN PATENT DOCUMENTS

| | | |
|---|---|---|
| 0 379 329 | 7/1990 | European Pat. Off. . |
| 0 478 396 | 4/1992 | European Pat. Off. . |
| 2 249 007 | 4/1974 | Germany . |
| 2 415 683 | 10/1974 | Germany . |
| 2 752 573 | 6/1978 | Germany . |
| 3 819 215 | 12/1989 | Germany . |
| 3 830 747 | 3/1990 | Germany . |
| 3 836 710 | 5/1990 | Germany . |
| 3 842 370 | 6/1990 | Germany . |
| 3 943 002 | 7/1991 | Germany . |
| 4 100 993 | 7/1991 | Germany . |
| 4 003 957 | 8/1991 | Germany . |
| 4 102 496 | 2/1992 | Germany . |
| 4 029 793 | 3/1992 | Germany . |
| 4 208 496 | 8/1993 | Germany . |
| 4 217 409 | 12/1993 | Germany . |
| 4 234 041 | 3/1994 | Germany . |
| 4 238 333 | 5/1994 | Germany . |
| 59-145652 | 8/1984 | Japan . |
| 61-098662 | 5/1986 | Japan . |
| 2 139 722 | 11/1984 | United Kingdom . |
| WO 90/13463 | 11/1990 | WIPO . |

OTHER PUBLICATIONS

U.S. application No. 07/423,315 (Labeled "A") for Automotive Vehicle Brake System.
German Search Report.
European Search Report.

*Primary Examiner*—Peter M. Poon
*Attorney, Agent, or Firm*—Ratner & Prestia

[57] ABSTRACT

A method and apparatus for controlling the braking pressure in an anti-lock brake system which includes a brake power booster operable by an electric control element, wherein the rotational speed of the individual vehicle wheels is determined, the actual rotational speed value measured on a wheel during braking is compared with a memorized desired rotational speed nominal value. The electric control element is actuated as a function of the comparison result.

20 Claims, 3 Drawing Sheets

METHOD AND APPARATUS FOR CONTROLLING BRAKING PRESSURE

This application is the U.S. national-phase application of PCT International Application No. PCT/EP95/01860.

BACKGROUND OF THE INVENTION

The present invention relates to a method and apparatus for controlling the braking pressure in an automotive vehicle brake system equipped with an ABS system and including a brake power booster operable by an electric control element, wherein the rotational speed of the individual vehicle wheels is determined.

A control method of this type is disclosed in German patent application No. 42 17 409, for example. In the implementation of the method described in the application, the braking pressure introduced into the wheel brake is compared with a memorized braking pressure nominal value, and the brake power booster is operated in order to vary the boosting force as a function of the comparison result. A disadvantage of this known method is the high costs incurred by the pressure measurement.

German patent application No. 42 38 333 discloses a vacuum brake power booster including a control valve which is electrically operable by an electromagnet. The electromagnet interacting with the valve member of the control valve is rigidly connected to a valve piston which operates the control valve mechanically. The valve member defines a pneumatic chamber in a control housing accommodating the control valve. The pneumatic chamber is connected to the ventilatable working chamber of the brake power booster by way of passages. Thus, the valve member is permanently pressure-balanced.

SUMMARY OF THE INVENTION

Therefore, an object of the present invention is to provide a method of braking pressure control of the type previously referred to which permits achieving an accurate analog control of the pressure introduced into the wheel brakes of the vehicle by making use of data which are already provided in up-to-date anti-lock brake systems.

According to the present invention, this object is achieved by a comparison of the actual rotational speed value measured on the wheel during braking with a memorized, desired rotational speed nominal value and by operation of the electric control element as a function of the comparison result. In specifying the present invention, the brake power booster is configured as a vacuum brake power booster which is operable by an electromagnet independently of the driver's wish, and the current which is to be supplied to the electromagnet is controlled directly proportionally as a function of the comparison result. Preferably, a value of the hydraulic pressure introduced in the master brake cylinder is assigned to each value of the independent actuating force generated by the electromagnet, to such effect that an increase in the hydraulic pressure corresponds to an increase in the independent actuating force.

In another preferred aspect of the present invention, the quality of the proposed control operation is enhanced because the current to be supplied to the electromagnet is controlled proportionally to the pneumatic differential pressure acting on the valve member. It is particularly favorable that a pneumatic effective surface is provided which interacts with the valve member of the control valve and, when acted upon by the pneumatic differential pressure, generates a force that counteracts the actuating force generated by the electromagnet.

The force counteracting the actuating force generated by the electromagnet includes the force of a valve spring, which biases the valve member in the closing direction of the control valve, and two pneumatic force components which act in opposition to each other. The first force component, which counteracts the force of the valve spring, is produced by the pneumatic pressure difference between the atmospheric pressure and the pressure prevailing in the working chamber, and by a first effective surface provided on the valve member. The second force component supporting the force of the valve spring is produced by the pneumatic pressure difference between the pressure prevailing in the working chamber and the vacuum prevailing in the vacuum chamber, and by a second effective surface provided on the valve member.

In still another preferred aspect of the present invention, the control operation is precisely adapted to the pneumatic ratios prevailing inside the vacuum brake power booster because the vacuum prevailing in the housing of the vacuum brake power booster is measured and the current to be supplied to the electromagnet is controlled in response to the vacuum value determined.

According to still further aspects of the present invention, the desired rotational speed nominal value is determined as a function of the actuating travel or the actuating speed of a brake pedal which mechanically actuates the vacuum brake power booster, under certain circumstances, as a function of the actuating force applied to the brake pedal. Other possibilities of determination include signaling devices arranged outside or inside the vehicle, for example, traffic monitoring satellites, radar sensors, or distance sensors. It is particularly appropriate in the proposed method to measure the on-time of the electromagnet and to take the measured value into account in the assessment of temperature effects.

The method according to the present invention will be explained in more detail in the following text by way of an example, making reference to the accompanying drawings.

DETAILED DESCRIPTION OF THE INVENTION

Figure 1:
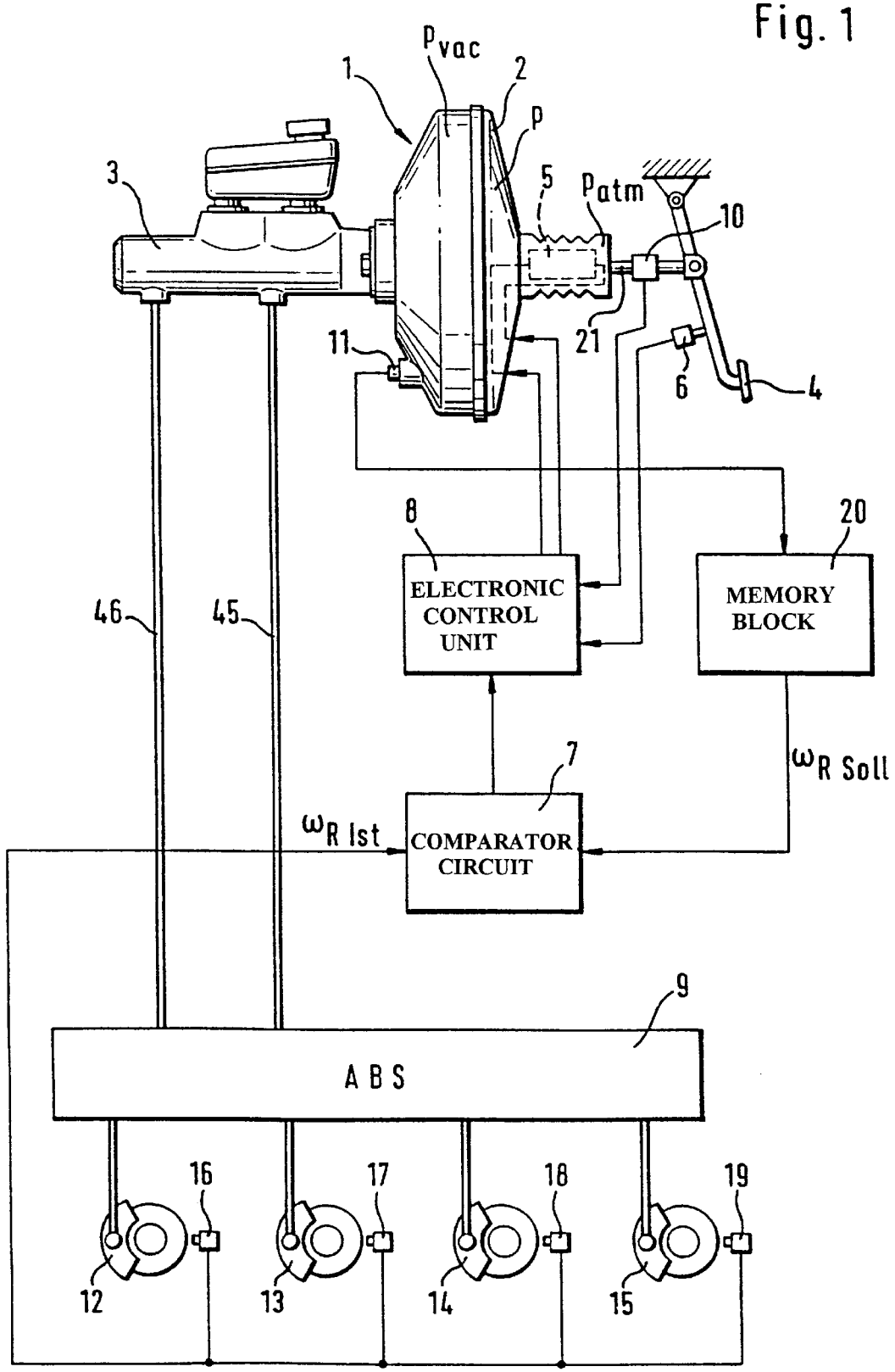
FIG. 1 is a flow chart showing the operation of a brake system in which the method of braking pressure control of the present invention can be achieved.

For implementing the control method according to the present invention, as shown in FIG. 1, the brake system for automotive vehicles mainly includes an actuating unit 1, an electronic control unit 8, wheel brakes 12, 13, 14, 15, an ABS/hydraulic unit or pressure modulator 9 interposed between the wheel brakes 12 to 15 and the actuating unit 1 as well as an ABS/TCS control unit (not shown) which produces control signals for the pressure modulator 9.

The actuating unit 1, in turn, includes a pneumatic brake power booster, preferably a vacuum brake power booster 2, which is operable by a brake pedal 4. A master brake cylinder 3, preferably a tandem master cylinder, is connected downstream of the brake booster 2 and has its pressure chambers (not shown) connected to the pressure modulator 9 by way of hydraulic lines 45, 46. An actuating rod 21 is coupled to the brake pedal 4 to permit actuation of a control valve 5 (shown schematically). Control valve 5 controls the build-up of a pneumatic differential pressure in the housing of the vacuum brake power booster 2.

A brake light switch 6 which is operatively connected to the brake pedal 4 permits identifying an actuation initiated by application of the brake pedal 4. The actuating speed is sensed by a sensor device which is preferably provided by an analog operation travel sensor 11 which is associated with the vacuum brake power booster 2.

The travel sensor 11 which senses movements of a movable wall (not shown) generating the boosting force and which is preferably designed as a linear potentiometer, continuously produces analog output signals which are subjected to a time-differentiating processing operation and correspond respectively to an instantaneous actuating speed of the brake pedal 4. Assigned to each actuating speed is a nominal wheel speed value $\omega_{RSoll}$ memorized in a memory block 20 to be conducted to a comparator circuit 7 interacting with the electronic control unit 8. The nominal value $\omega_{RSoll}$ corresponds to a desired rotational wheel speed preselected by the driver by depression of the brake pedal 4. Assigned to each of the vehicle wheels (not shown) is a wheel sensor 16, 17, 18, 19 whose signal corresponding to an actual rotational wheel speed value $\omega_{RIst}$ is compared to the desired wheel speed nominal value $\omega_{RSoll}$ in the comparator circuit 7. The electronic control unit 8 generates control signals to adjust the vacuum brake power booster 2 as a function of the comparison result produced in the comparator circuit 7. Independent actuation of the control valve 5 of the vacuum brake power booster 2 is effected by way of an electromagnet 22 (FIG. 2) operable by the control signals of the electronic control unit 8, irrespective of the actuating force introduced on the brake pedal 4.

Figure 2:
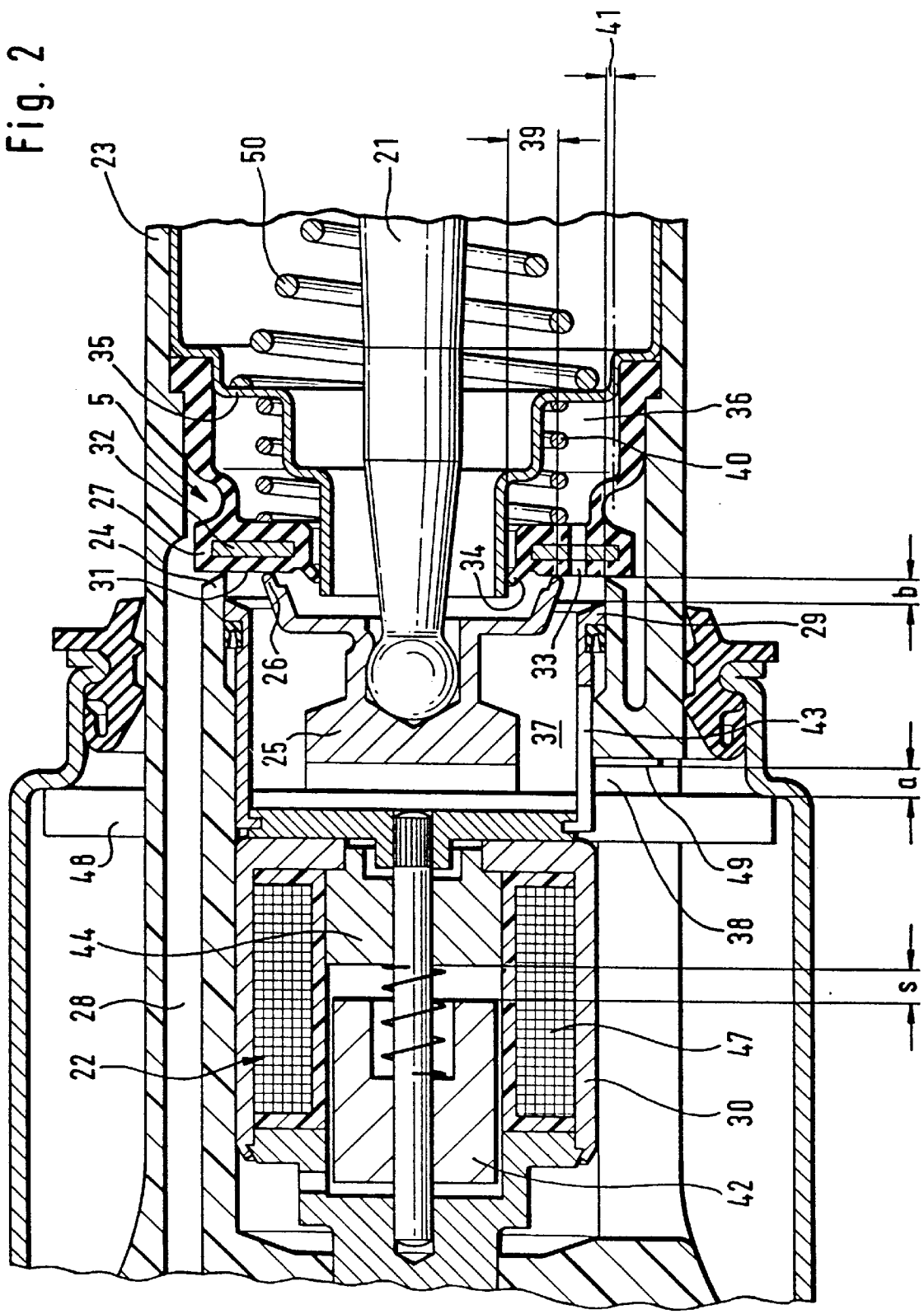
FIG. 2 is an enlarged view of a control valve of a vacuum brake power booster which can be used in the brake system of FIG. 1.

As can be seen in FIG. 2 in particular, the control valve 5 is accommodated in a control housing 23 which is sealed and guided in the housing of the vacuum brake power booster 2 shown in FIG. 1. Control valve 5 includes a first sealing seat 24 provided on the control housing 23, a second sealing seat 26 provided on a valve piston 25 connected to the actuating rod 21 and a valve member 27 interacting with both sealing seats 24, 26. Further, a laterally extending channel 28 is provided in the control housing 23 and permits a connection between the working chambers of the vacuum brake power booster 2 (not shown).

As can further be seen in FIG. 2, the valve member 27 has an annular sealing surface 31 interacting with the two sealing seats 24, 26. Sealing surface 31 has several axial passages 33 and is reinforced by means of a metallic reinforcing disc 32. Radially inwardly adjoining the sealing surface 31 is a sealing lip 34 which, in the mounted condition of the valve member 27 in the control housing 23, is in sealing abutment on the housing inside wall or on a retaining ring 35 retaining the valve member 27 to define a pneumatic chamber 36 in the control housing 23. The flow ducts provided by the passages 33 (not referred to in detail) connect the pneumatic chamber 36 to an annular chamber 37 confined by the sealing seats 24, 26. A pneumatic channel 38 connected to the ventilatable working chamber terminates into annular chamber 37. The result is that the pneumatic chamber 36 arranged on the side of the valve member 27 remote from the sealing surface 31 is constantly connected to the working chamber (not shown), and pressure balance occurs on the valve member 27.

The radially inward diameter of the sealing lip 34 and the second sealing seat 26 provided on the valve piston 25 define a first pneumatic effective surface 39 on the valve member 27. Application of the pneumatic difference in pressure between the atmospheric pressure and the pressure prevailing in the working chamber to the effective surface 39 results in a first force component. The first force component counteracts the force of a valve spring 40 which preloads the valve member 27 in the closing direction of the control valve 5 and is reduced with increasing ventilation of the working chamber or chamber 36. The application of the pneumatic difference in pressure between the pressure prevailing in the working chamber and the vacuum prevailing in the vacuum chamber to a second pneumatic effective surface 41, provided in the intermediate area of the valve member 27, causes a second pneumatic force component which assists the effect of the above-mentioned valve spring 40 and increases with increasing ventilation of the working chamber or chamber 36.

To initiate the above-mentioned operation of the brake power booster which is independent of the actuating rod 21, a third sealing seat 29 is arranged radially between the first sealing seat 24 and the second sealing seat 26. Sealing seat 29 is operable by way of the electromagnet 22 which is arranged in an axial bowl-shaped extension 30 of the valve piston 25 and, consequently, is displaceable along with the valve piston 25 in the control housing 23.

The electromagnet 22 has a coil 47, which is slipped onto a guide element 44 attached within the extension 30, and a cylindrical armature 42 which is slidable in the coil. Armature 42 is in force-transmitting connection with a sleeve 43 sealed in the control housing 23. Sleeve 43 includes the third sealing seat 29 permitting the actuating force generated by the electromagnet 22 to be transmitted to the third sealing seat 29. In this arrangement, the third sealing seat 29 is axially offset (see distance 'b') with respect to the second sealing seat 26 provided on the valve piston 25.

During an independent braking operation initiated by energization of the coil 47, the armature 42 is displaced to the right, as viewed in the drawing, causing the third sealing seat 29 to initially move into abutment on the sealing surface 31 of the valve member 27 after having covered the distance 'b'. This abutment bridges the first sealing seat 24 provided on the control housing 23 in terms of effect so that there is no connection between the pneumatic working chambers of the brake power booster 2. Subsequently, the third sealing seat 29 and the valve member 27 will move jointly, and the second sealing seat 26 is opened and the ventilatable working chamber of the vacuum brake power booster 2 is ventilated. The movement of the third sealing seat 29 lasts until the armature 42 abuts on the guide element 44 and the slot 's' between the two parts becomes zero. In the absence of actuating force on the actuating rod 21, the control housing 23 covers a distance relative to the valve piston 25 which corresponds to the distance 'a' between a cross member 48 limiting the movement of the valve piston 25 and a stop surface 49 provided on the control housing 23. The reason for this movement is a piston rod return spring 50 which moves the valve piston 25 to the right by way of the actuating rod 21 and tries to close the second sealing seat 26 again. However, because the third sealing seat 29 is synchronously entrained due to the rigid connection between the electromagnet 22 and the valve piston 25, the slot between the valve member 27 and the second sealing seat 26 is kept open, namely by the dimension s–b. The ventilatable working chamber of the brake power booster 2 is thereby connected to the atmosphere, and brake force is generated.

To ensure that the electromagnet 22 is reliably disconnected upon termination of the braking operation assisted by independent force, an electric switching device 10 is provided which is shown only schematically in FIG. 1.

Figure 3:
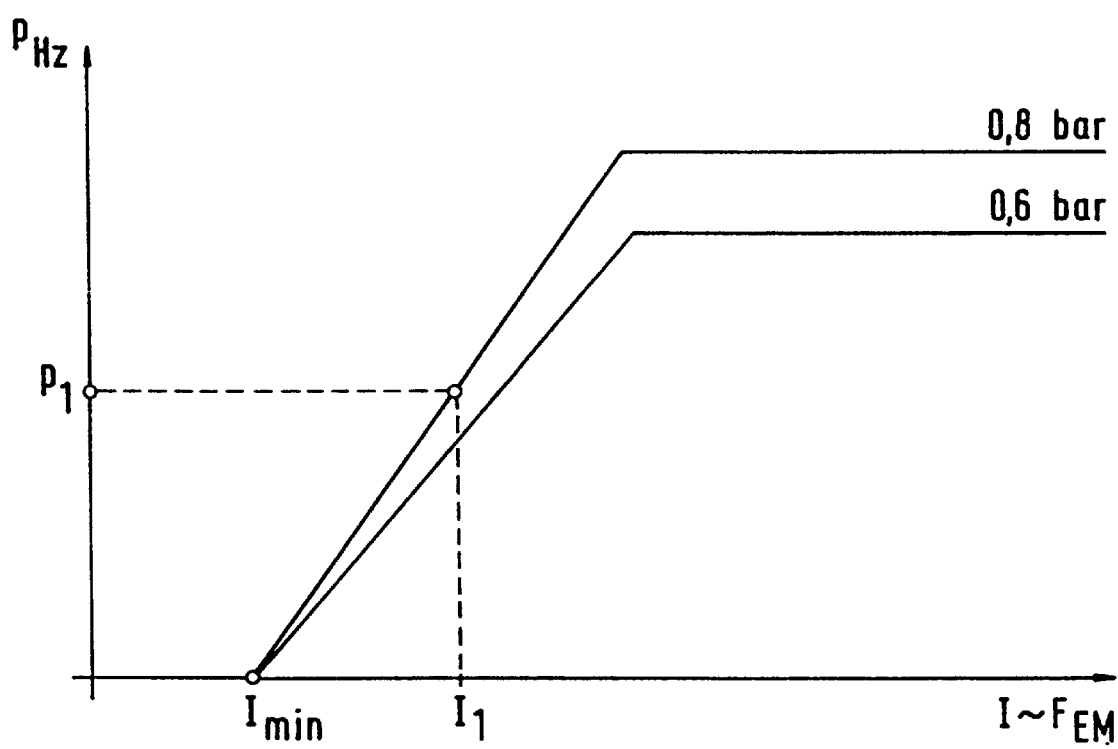
FIG. 3 is a diagram showing the relation between the braking pressure to be controlled and the current p=f (I) to be supplied to the electromagnet.

As has already been mentioned hereinabove, the desired wheel speed nominal value $\omega_{RSoll}$ assigned to the actuating speed of the brake pedal 4 and the actual wheel speed value $\omega_{RIst}$ determined on the wheel are compared in the comparator circuit 7 during control operations. A signal responsive to the comparison result actuates the electronic control unit 8 to generate control signals or current signals for the electromagnet 22 which actuates the control valve 5 of the vacuum brake power booster 2. It must be ensured that the independent actuating force generated by the electromagnet 22 is in excess of the previously described sum of the force components acting on the valve member 27 of the control valve 5. It can be taken from the description of the operation of control valve 5 illustrated in FIG. 2 that an increase of the independent actuating force generated by the electromagnet 22 or the current supplied to the electromagnet 22 causes an increase in the hydraulic pressure generated by the vacuum brake power booster 2 in the master brake cylinder 3. FIG. 3 of the drawing shows the relation between the hydraulic pressure generated in the master brake cylinder 3 and the electromagnetic independent actuating force or the electric current to be supplied to the electromagnet 22.

If the comparison between the wheel speed nominal value $\omega_{RSoll}$ assigned to the pedal application speed and the actual wheel speed value $\omega_{RIst}$ determined by one of the sensors 16 to 19 shows that the nominal value $\omega_{RSoll}$ is smaller than the actual value, the control valve 5 of the vacuum brake power booster 2 is actuated with the effect of a pressure increase in the master brake cylinder 3 until the difference between both rotational speed values becomes zero. The pressure introduced into the master brake cylinder 3 can be maintained by energization of the electromagnet 22 with a constant current. Pressure reduction in the master brake cylinder 3 during the control operation is achieved by correspondingly reducing the current supplied to the electromagnet 22. Should, however, the comparison show that the nominal value exceeds the actual value, the excessive braking pressure introduced into the wheel brakes may be reduced either by intervention of the existing ABS system or by reduction of the current supplied to the electromagnet 22.

We claim:

1. Method of controlling the braking pressure in an automotive vehicle brake system equipped with an ABS system and including a vacuum brake power booster operable by an electromagnet independently of the driver's wish, and a master brake cylinder connected downstream of the vacuum brake power booster, said method comprising the steps of:

(a) determining a rotational speed of individual wheels of a vehicle;

(b) assigning a value of hydraulic pressure introduced in the master brake cylinder to a value of an independent actuating force generated by the electromagnet based on the rotational speed of individual wheels of the vehicle; and (c) controlling a current supplied to the electromagnet to increase the independent actuating force generated by the electromagnet when the hydraulic pressure in the master brake cylinder is increased based on the assignment of step (b).

2. Method as claimed in claim 1, wherein the electromagnet actuates a valve member of a control valve which controls a pneumatic differential pressure acting in the vacuum brake power booster, characterized in that the current supplied to the electromagnet is controlled proportionally to the pneumatic differential pressure acting on the valve member.

3. Method as claimed in claim 2, wherein the electromagnet actuates the valve member of the control valve which controls the pneumatic differential pressure acting in the brake power booster, and wherein the master brake cylinder is connected downstream of the brake power booster, characterized in that a value of the hydraulic pressure introduced in the master brake cylinder is assigned to each value of the independent actuating force generated by the electromagnet, to such effect that an increase in the hydraulic pressure corresponds to an increase in the independent actuating force.

4. Method as claimed in claim 3, characterized in that the current supplied to the electromagnet is controlled proportionally to the pneumatic differential pressure acting on the valve member, as a function of a comparison between the rotational speeds of individual wheels of the vehicle and a desired rotational speed nominal value.

5. Method as claimed in claim 4, characterized in that a pneumatic effective surface interacting with the valve member of the control valve is provided and, when acted upon by the pneumatic differential pressure, generates a force that counteracts the actuating force generated by the electromagnet.

6. Method as claimed in claim 5, wherein the vacuum brake power booster includes an evacuatable vacuum chamber and a ventilatable working chamber, characterized in that the force counteracting the independent actuating force generated by the electromagnet includes the force of a valve spring, which preloads the valve member in the closing direction of the control valve, and two pneumatic force components which act in opposition to each other, wherein the first force component, which counteracts the force of the valve spring, is produced by the pneumatic pressure difference between the atmospheric pressure and the pressure prevailing in the working chamber, and by a first effective surface provided on the valve member, and the second force component supporting the force of the valve spring is produced by the pneumatic pressure difference between the pressure prevailing in the working chamber and the vacuum prevailing in the vacuum chamber, and by a second effective surface provided on the valve member.

7. Method as claimed in claim 6, characterized in that the vacuum prevailing in the housing of the vacuum brake power booster is measured, and the current supplied to the electromagnet is controlled in response to the measured vacuum value.

8. Method as claimed in claim 7, wherein the vacuum brake power booster is operable by a brake pedal, characterized in that an actuating speed of the brake pedal is sensed, and the desired rotational speed nominal value is determined as a function of the sensed actuating speed of the brake pedal.

9. Method as claimed in claim 8, characterized in that an actuating travel of the brake pedal is sensed, and the desired rotational speed nominal value is determined as a function of the sensed actuating travel of the brake pedal.

10. Method as claimed in claim 8, characterized in that an actuating force acting upon the brake pedal is sensed, and the desired rotational speed nominal value is determined as a function of the sensed actuating force acting upon the brake pedal.

11. Method as claimed in claim 8, characterized in that the desired rotational speed nominal value is determined as a function of an output signal of a signaling device arranged at a location outside the vehicle.

12. Method as claimed in claim 11, wherein the signaling device is a traffic monitoring satellite.

13. Method as claimed in claim 8, characterized in that the desired rotational speed nominal value is determined as a function of an output signal of a signaling device arranged at a location inside the vehicle.

14. Method as claimed in claim 13, wherein the signaling device is a distance sensor.

15. Method as claimed in claim 8, characterized in that an on-time value of the electromagnet is determined and taken into account in an assessment of temperature effects.

16. Apparatus for controlling the braking pressure in an automotive vehicle brake system equipped with an ABS system, said apparatus comprising:

a brake pedal;

a vacuum brake power booster responsive to movements of said brake pedal;

a master brake cylinder, responsive to said vacuum brake power booster, for controlling pressure in wheel brakes of the vehicle brake system;

means for developing indications of the actual rotational speeds of wheels of the vehicle;

means for sensing the actuation speeds of said brake pedal and for developing indications of the actuation speeds of said brake pedal;

means for storing nominal values of the rotational speeds of the wheels of the vehicle corresponding to the speeds of actuation of said brake pedal and for selecting nominal wheel rotational speeds corresponding to the brake pedal actuation speeds upon applications of said brake pedal;

means for comparing the actual wheel rotational speeds with the selected nominal wheel rotational speeds and for developing indications of the differences between the actual wheel rotational speeds and the nominal wheel rotational speeds; and means, responsive to the indications of differences between the actual wheel rotational speeds and the nominal wheel rotational speeds, for controlling said vacuum brake power booster independent of movements of said brake pedal.

17. Apparatus according to claim 16 wherein said means for controlling said vacuum brake power booster independent of movements of said brake pedal include:

(a) an electronic control unit, responsive to said comparison means, for developing control signals representative of differences between the actual wheel rotational speeds and the nominal wheel rotational speeds, (b) an electromagnet responsive to the control signals, and (c) a control valve, responsive to said electromagnet, for controlling said vacuum brake booster.

18. Apparatus according to claim 17 wherein said control valve controls the pneumatic differential pressure acting in said brake power booster.

19. Apparatus according to claim 18 wherein said control valve has a valve member which is actuated by said electromagnet to control the pneumatic differential pressure acting in said brake power booster in response to the control signals.

20. A method of controlling the braking pressure in a brake system including a vacuum brake power booster operable by an electromagnet, said method comprising the steps of:

(a) measuring a rotational wheel speed;

(b) sensing an actuation speed of a brake pedal;

(c) assigning a nominal wheel speed to the actuation speed of the brake pedal;

(d) comparing the rotational wheel speed to the nominal wheel speed; and (e) controlling a current supplied to the electromagnet based on the result of the comparison of step (d).

* * * * *